Patented Aug. 22, 1950

2,519,507

UNITED STATES PATENT OFFICE 2,519,507

20,21-DIACETOXY-4-BROMO-3,11-DIKETO-PREGNANES

Lewis H. Sarett, Princeton, N. J., assignor to Merck & Co., Inc., Rahway, N. J., a corporation of New Jersey No Drawing. Application August 2, 1946, Serial No. 687,983

3 Claims. (Cl. 260—397.4)

This invention is concerned generally with novel chemical compounds of the cyclopentanodimethylpolyhydrophenanthrene series and to processes of preparing the same; more particularly, it relates to stereoisomers of 4-bromo-3,11-diketo - 20,21 - diacyloxypregnane and to methods for preparing these stereoisomers from readily available starting materials. These compounds are useful in the preparation of adrenal hormones such as dehydrocorticosterone and esters thereof, and for other purposes. They are also of value as a means of establishing the structure of other organic compounds.

These stereoisomeric 4-bromo-3,11 - diketo-20,21-diacyloxy pregnanes, can be represented by the following structural formulae:

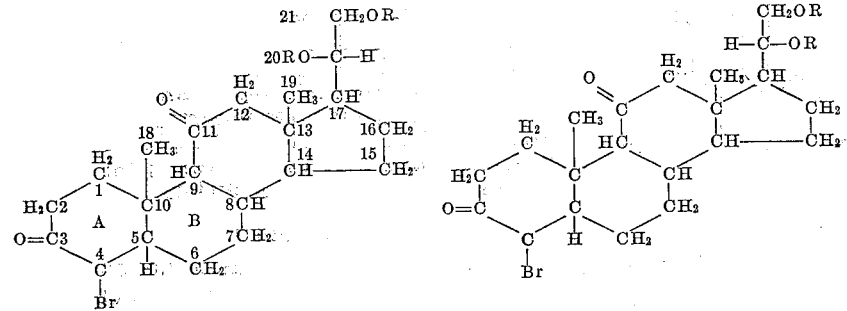

wherein R is acyl.

These formulae for purposes of convenience, are hereinafter reproduced below in the abbreviated form:

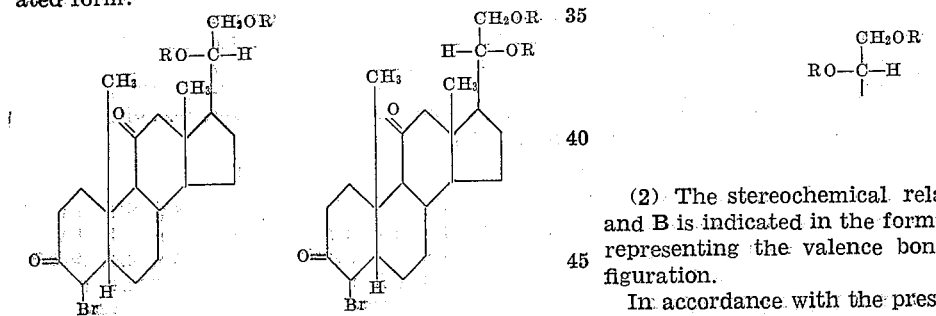

wherein R has the significance above defined.

In the following description of the invention, the stereochemical relations of the substituents are indicated by the following conventions:

(1) A substituent at the $C_{20}$ position is arbitrarily indicated as $\alpha$ or $\beta$ depending upon the stereochemical configuration thereof; in this application the convention is adopted that the configuration is represented by writing the $C_{20}$ substituent (acyloxy) at the right of the $C_{20}$ carbon side chain thus;

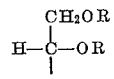

and in the case of the epimeric $\alpha$ configuration,

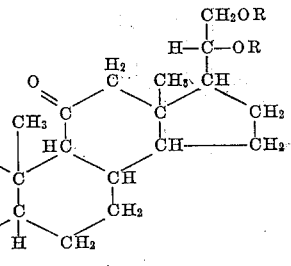

the substituent is written to the left of the side chain thus;

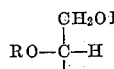

(2) The stereochemical relations of rings A and B is indicated in the formulae by a solid line representing the valence bond in the cis configuration.

In accordance with the present invention, it is now found that 4-bromo-3,11-diketo-20,21-diacyloxypregnanes can be synthesized by reactions indicated generically as follows:

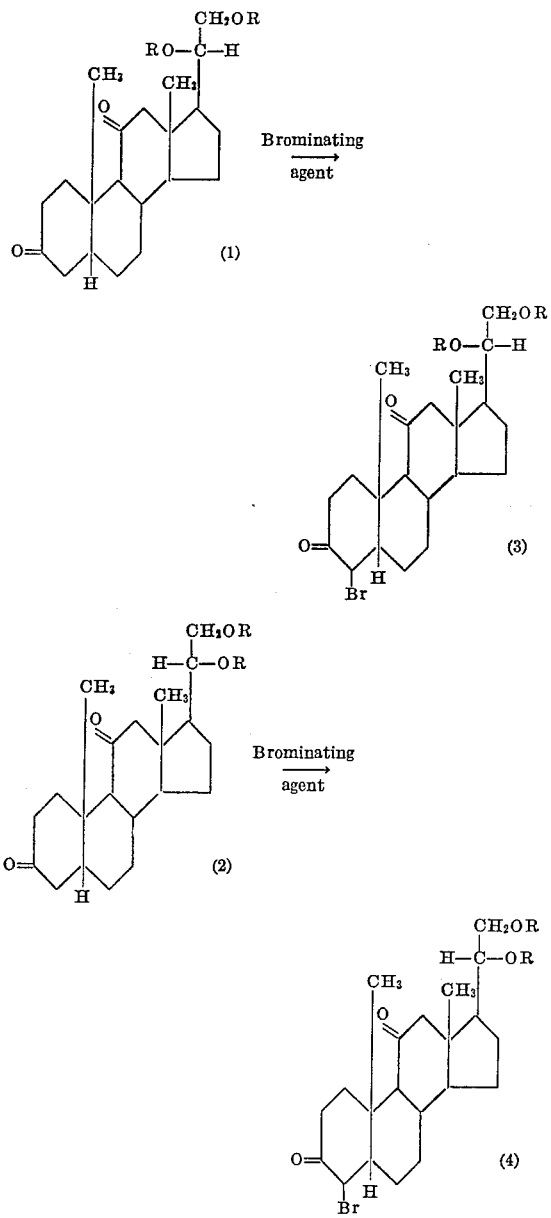

in the above formulae R is acyl.

The reactions indicated above are conducted as follows:

A stereoisomer of 3,11-diketo-20,21-diacyloxy-pregnane (1 and 2) or a mixture of stereoisomers thereof, which can be prepared as disclosed in my copending applications, Serial No. 649,760, filed February 23, 1946 (which is a continuation-in-part of application Serial No. 605,194, filed July 13, 1945, now abandoned); Serial No. 687,982, filed August 2, 1946, now Patent No. 2,505,838; and Serial No. 687,980, filed August 2, 1946, now Patent No. 2,516,258; is reacted with a brominating agent to produce the corresponding stereoisomer, or mixtures of stereoisomers, of 4-bromo-3,11-diketo-20,21-diacyloxypregnane (3 and 4). This product can be converted to an ester of dehydrocorticosterone according to processes disclosed in my copending application, Serial No. 687,981 filed August 2, 1946, now Patent No. 2,510,940.

In accordance with the present invention, a stereoisomer of 3,11-diketo-20,21-diacyloxy-pregnane, as for example 3,11-diketo-20-($\alpha$)-21-diacetoxy-pregnane; 3,11-diketo-20-($\beta$)-21-diacetoxy-pregnane; 3,11-diketo-20-($\alpha$)-21-dipropionoxy-pregnane; 3,11-diketo-20-($\beta$)-21-dipropionoxy-pregnane; 3,11-diketo-($\alpha$)-21-dibutyroxy-pregnane; 3,11-diketo-20-($\beta$)-21-dibutyroxy-pregnane; 3,11-diketo-20-($\alpha$)-21-dibenzoxy-pregnane; 3,11-diketo-20-($\beta$)-21-dibenzoxy-pregnane; or mixtures thereof, is reacted with a substantially equimolecular quantity of bromine in an inert solvent such as glacial acetic acid.

It is important not to use substantially more than an equimolecular quantity of bromine because the use of an excess favors the formation of the dihalide. The bromine enters the molecule at the 4-position to form the corresponding stereoisomer of 4-bromo-3,11-diketo-20,21-diacyloxy-pregnane, which can be represented by the following structural formula:

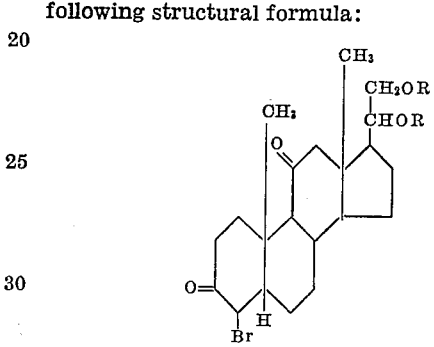

wherein R is acyl.

In applicant's preferred procedure, 3,11-diketo-20,21-diacyloxy - pregnanes are reacted with bromine in glacial acetic acid, after which the product is isolated as follows: The reactant is dissolved in a solvent such as ether, the ether solution washed with a dilute alkaline solution containing an alkali or alkaline earth hydroxide or carbonate, whereby acidic materials are removed from the ether solution which is evaporated to dryness under reduced pressure, and the product can be purified if desired by recrystallization from an aliphatic alcohol, such as ethyl alcohol to produce the corresponding 4-bromo-3,11-diketo-20,21-diacyloxy-pregnane.

The following examples illustrate methods of carrying out the present invention, but it is to be understood that these examples are given by way of illustration and not of limitation.

*Example 1*

About 663 mg. of 3,11-diketo-20-($\beta$)-21-diacetoxy-pregnane is dissolved in about 25 cc. of glacial acetic acid and a solution containing about 260 mg. of bromine in about 2.6 cc. of glacial acetic acid is added thereto. The bromine is decolorized after a few minutes and the solution is then poured into a mixture of chloroform and dilute aqueous sodium bicarbonate solution. The mixture is shaken, the chloroform layer separated and washed with water and evaporated to dryness under reduced pressure to produce amorphous 4-bromo-3,11-diketo-20-($\beta$)-21-diacetoxy-pregnane.

*Example 2*

About 703 mg. of 3,11-diketo-20-($\alpha$)-diacetoxy-pregnane is dissolved in about 2.8 cc. of glacial acetic acid and a solution containing about 276 mg. of bromine in about 2.76 cc. of glacial acetic acid is added thereto. After decolorization, the product is isolated as described in Example 1 to produce amorphous 4-bromo-3,11-diketo-20-(α)-21-diacetoxy-pregnane.

Modifications may be made in carrying out the present invention without departing from the spirit and scope thereof and the invention is to be limited only by the appended claims.

I claim:

1. 20,21 - diacetoxy-4-bromo-3,11-diketo-pregnanes.

2. 4 - bromo-3,11-diketo-20-(α)-21-diacetoxy-pregnane.

3. 4 - bromo-3,11-diketo-20-(β)-21-diacetoxy-pregnane.

LEWIS H. SARETT.

REFERENCES CITED

The following references are of record in the file of this patent:

UNITED STATES PATENTS

| Number | Name | Date |
|---|---|---|
| 2,256,500 | Serini | Sept. 23, 1941 |

Certificate of Correction

Patent No. 2,519,507                                              August 22, 1950

LEWIS H. SARETT

It is hereby certified that error appears in the printed specification of the above numbered patent requiring correction as follows:

Column 3, lines 62 and 63, for the filing date "July 13, 1945" read *July 14, 1945*; column 4, line 56, for "25 cc." read *2.5 cc.*;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*